(12) United States Patent
Ross

(10) Patent No.: US 10,189,648 B2
(45) Date of Patent: Jan. 29, 2019

(54) FLEXIBLE AUGER CONVEYOR

(71) Applicant: RECOVER ENERGY SERVICES INC., Calgary (CA)

(72) Inventor: Stan Ross, Cochrane (CA)

(73) Assignee: RECOVER ENERGY SERVICES INC., Calgary, Alberta (CA)

( * ) Notice: Subject to any disclaimer, the term of this patent is extended or adjusted under 35 U.S.C. 154(b) by 0 days.

(21) Appl. No.: 15/811,870

(22) Filed: Nov. 14, 2017

(65) Prior Publication Data

US 2018/0141758 A1 May 24, 2018

Related U.S. Application Data

(60) Provisional application No. 62/423,917, filed on Nov. 18, 2016.

(51) Int. Cl.
*B65G 33/26* (2006.01)
*B65G 33/16* (2006.01)
*B65G 33/32* (2006.01)
*D07B 1/06* (2006.01)

(52) U.S. Cl.
CPC .......... *B65G 33/16* (2013.01); *B65G 33/265* (2013.01); *B65G 33/32* (2013.01); *D07B 1/0673* (2013.01); *B65G 2201/042* (2013.01); *B65G 2812/0522* (2013.01); *B65G 2812/0555* (2013.01); *D07B 2201/2001* (2013.01)

(58) Field of Classification Search
CPC . B65G 33/26; B65G 33/30; B65G 2812/0522
USPC ................................. 198/659, 672
See application file for complete search history.

(56) References Cited

U.S. PATENT DOCUMENTS

| | | | |
|---|---|---|---|
| 2,438,637 A * | 3/1948 | Jansen | B65G 33/00 198/659 |
| 2,763,362 A | 9/1956 | Greaves | |
| 3,092,241 A * | 6/1963 | Orville | B65G 33/00 198/659 |
| 3,219,178 A * | 11/1965 | Mayrath | B65G 33/00 198/659 |
| 3,709,357 A * | 1/1973 | Brown | B65G 33/00 198/659 |
| 3,727,746 A | 4/1973 | Slusher | |
| 5,099,984 A * | 3/1992 | Kuzub | B65G 33/16 198/659 |
| 5,119,931 A | 6/1992 | Barenthsen | |

(Continued)

FOREIGN PATENT DOCUMENTS

FR           1458145      * 4/1965      ..... B65G 2812/0522

*Primary Examiner* — James R Bidwell
(74) *Attorney, Agent, or Firm* — Greenblum & Bernstein, P.L.C.

(57) ABSTRACT

Auger conveyors most commonly employed in industries where the horizontal and/or vertical transfer of solids or semi-solid materials is required. Auger conveyors employ a rotating helical screw blade, commonly known as flighting, which rotates about on an inline axis within an inline conduit. Described herein is an auger conveyor which does not need to follow the traditional rule of rotating about on an inline axis. A flexible wire rope shaft is employed to rotate about on an infinite number of axes thereby facilitating an auger conveyor connected to the flexible wire rope shaft through buttons, to traverse a non-linear path.

69 Claims, 13 Drawing Sheets

(56) References Cited

U.S. PATENT DOCUMENTS

| | | | | |
|---|---|---|---|---|
| 5,295,573 A | * | 3/1994 | Ohtsuji | B65G 33/04 |
| | | | | 198/659 |
| 5,687,832 A | * | 11/1997 | Thiessen | B65G 33/24 |
| | | | | 198/676 |
| 2013/0132504 A1 | | 5/2013 | Kohli et al. | |

* cited by examiner

Figure 1
Commonly Used Wire Rope Cross Sections
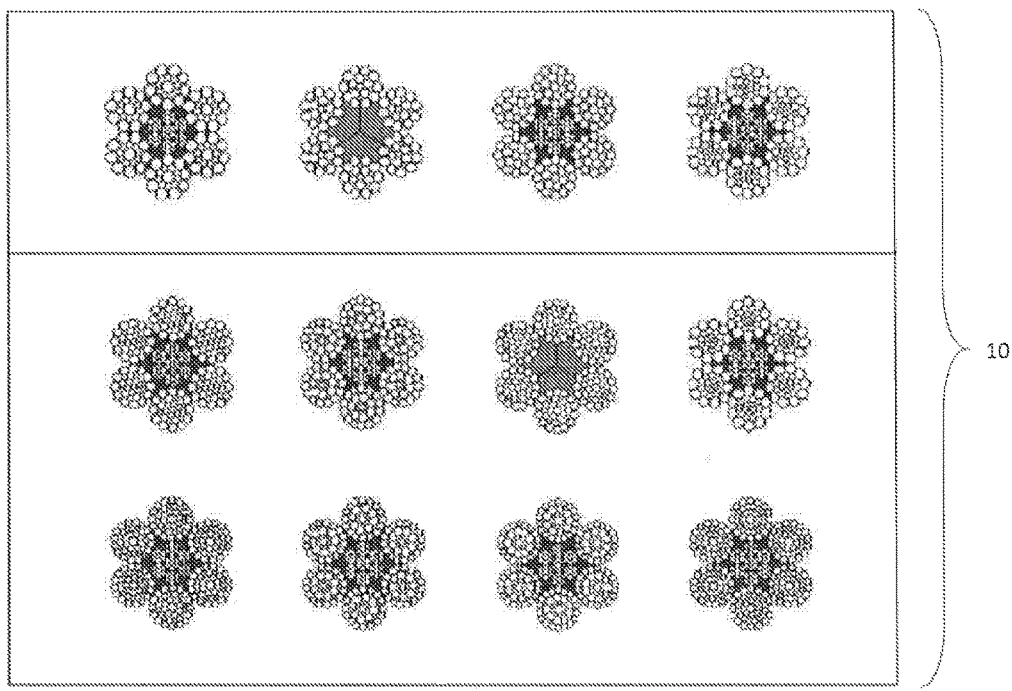
Cross sections of rotation resistant rope constructions.
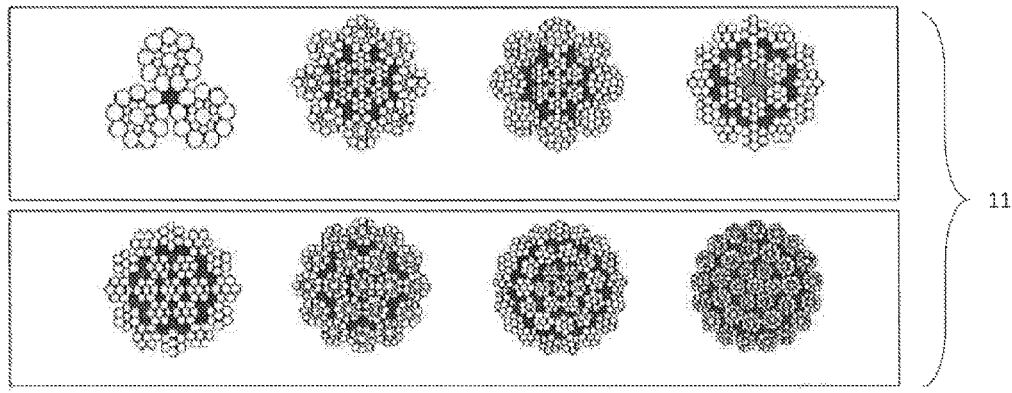

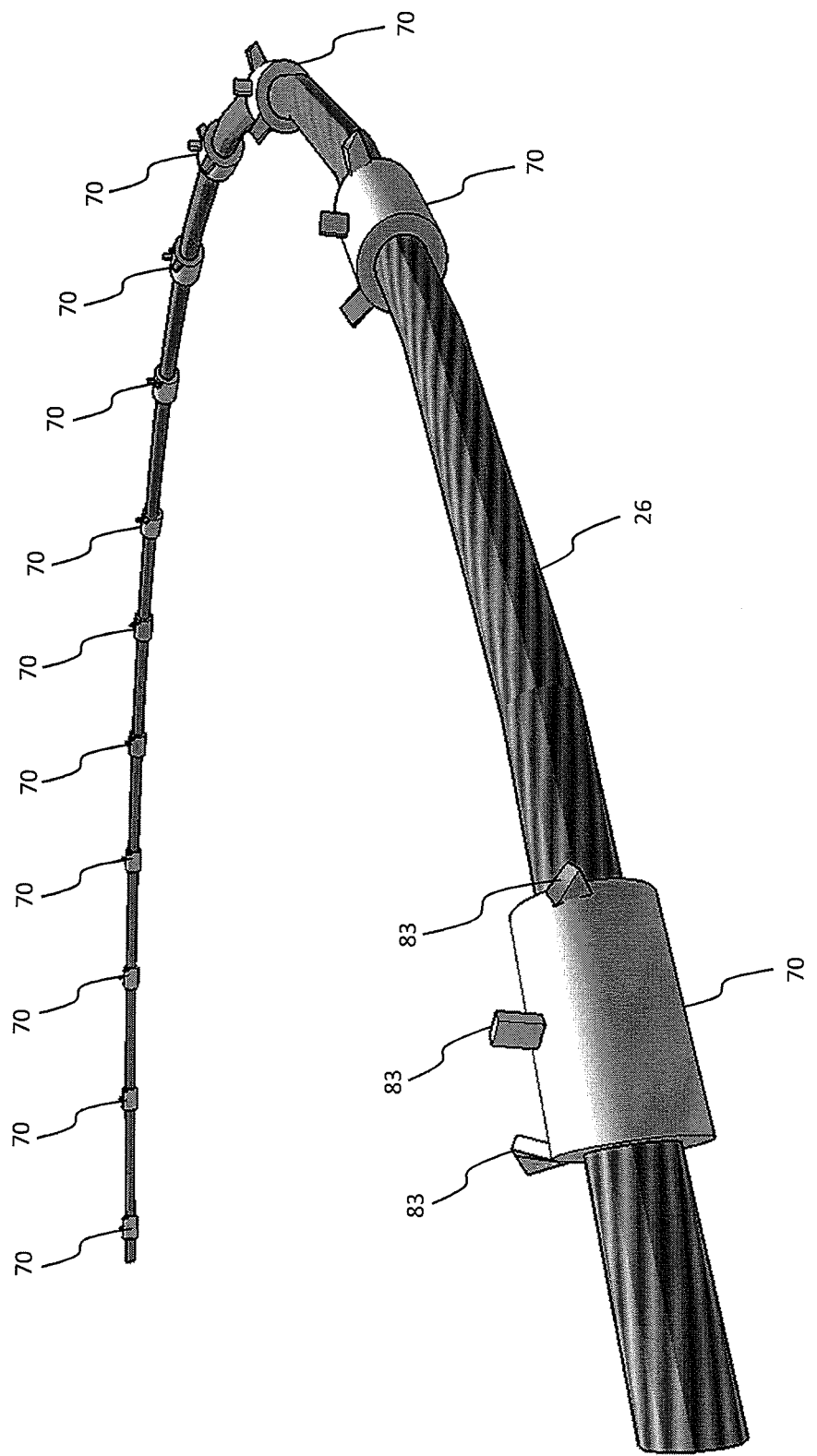

FLEXIBLE AUGER CONVEYOR

CROSS-REFERENCE TO RELATED APPLICATION

The present application claims the benefit under 35 U.S.C. § 119(e) of U.S. provisional application Ser. No. 62/423,917 filed on Nov. 18, 2016, the disclosure of which is hereby expressly incorporated by reference in its entirety.

TECHNICAL FIELD

The field of art to which this invention generally pertains is the conveyance of materials.

BACKGROUND

In an effort to convey materials from one point to another, conveyors are typically utilized. Conveyors can consist of pneumatic blowers, augers, belts running on rollers or chain drags.

Auger conveyors (also known as a screw conveyor, or an Archimedes' screw) employ a rotating helical screw blade, commonly known as flighting, which rotates about on an inline axis within an inline conduit. While augers are typically employed to move granular solids, they can also be used to move liquids or a mixture of solids and liquids.

Auger conveyors are most commonly employed in industries where the horizontal or vertical (or a combination of both) transfer of solids or semi-solid materials is required. Examples include industries that process food waste, wood chips, aggregates, cereal grains, animal feed, boiler ash, meat and bone meal, municipal solid waste, and many others.

Augers are typically driven at one end by an electric, hydraulic, pneumatic or internal combustion engine, while allowed to freely rotate within a bearing at the opposite end. The rate of volume transfer is proportional to the rotation rate of the shaft. In industrial control applications, the device is often used as a variable rate feeder by varying the rotation rate of the shaft to deliver a measured rate or quantity of material into a process.

Screw conveyors can be operated with the flow of material inclined upward. When space allows, this is a very economical method of elevating and conveying. As the angle of inclination increases, the capacity of a given unit decreases.

The primary drawback of an industrial auger conveyor is that they require an inline path, meaning they rotate on only a single axis. Thus, if the receiving and delivery points of the auger are not in a direct line, one or more auger conveyors, or a different type of conveyor, is required for the application.

Thus, there is need to facilitate a means of mechanical conveyance in an efficient manor, on a non-inline path.

BRIEF SUMMARY

An auger conveyor apparatus is described particularly adapted for conveying materials from a first point to at least one additional second point including at least one section of auger flighting attached to a flexible wire rope shaft section, an elongated conduit at least partially surrounding the at least one section of auger flighting creating a housing for the auger flighting, the conduit including at least one flighting inlet section and at least one flighting outlet section extending along the length of the conduit, the conveyor capable of having more than one axis of travel over the entirety of the length of the conduit, at least one first bearing at or near the inlet and/or outlet section, the at least one bearing capable of being attached to a rigid drive shaft operatively attached to the flexible wire rope shaft section, and a mechanical rotation power source connected to the solid steel shaft capable of causing the flighting and shaft to simultaneously rotate about the more than one axis of travel.

Additional embodiments include: the apparatus described above where the flexible wire rope shaft section comprises at least one section of wire rope; the apparatus described above where the flexible wire rope shaft section comprises multiple wire ropes wound together to create a single wire rope section; the apparatus described above where the flexible wire rope shaft section comprises a left lay wire rope; the apparatus described above where the flexible wire rope shaft section comprises left lay wire rope with left hand flighting; the apparatus described above where the flexible wire rope shaft section comprises left lay wire rope with right hand flighting; the apparatus described above where the flexible wire rope shaft section comprises right lay wire rope; the apparatus described above where the flexible wire rope shaft section comprises right lay wire rope with right hand flighting; the apparatus described above where the flexible wire rope shaft section comprises right lay wire rope with left hand flighting; the apparatus described above where the flexible wire rope is up to 25 millimeters in diameter; the apparatus described above where the flexible wire rope is greater than 25 millimeters in diameter; the apparatus described above 2 where the flexible wire rope is at least 50 millimeters in diameter; the apparatus described above where the flexible wire rope is at least 75 millimeters in diameter; the apparatus described above 1 additionally containing helical flighting around the flexible wire rope greater than three times the diameter of flexible wire rope shaft; the apparatus described above 1 including at least one button compressed against the flexible wire rope shaft section creating a solid point to which the auger flighting is attached; the apparatus described above including a button clamped to the flexible wire rope shaft section creating a solid point to which the auger flighting is attached; the apparatus described above 1 including multiple buttons compressed against the wire rope shaft section, each button being separated from the other along a length of the wire rope shaft section; the apparatus described above where the button is steel and is capable of being used as a point of contact for a hangar bearing to suspend the button and wire rope section within the conduit; the apparatus described above including a hangar bearing which is attached to and at least partially suspends the wire rope section within the conduit; the apparatus described above including a short solid steel shaft section that protrudes the end wall of the conduit and is supported by at least one bearing; the apparatus described above where the short solid steel shaft section is operationally connected to a button which is compressed against the longer flexible wire rope shaft section; the apparatus described above where the short solid steel shaft section is close coupled to a button which is operationally connected to the longer flexible wire rope shaft section; the apparatus described above 1 where the conduit comprises a round pipe or a substantially U-shape trough; the apparatus described above where the conduit comprises metal; the apparatus described above where the conduit comprises rubber; the apparatus described above 1 where the conduit comprises flexible synthetic pipe; the apparatus described above including at least one second bearing at or near the inlet and/or outlet section located opposite the inlet and/or outlet section where the first bearing is located, the second bearing capable of accommodating at least one solid steel shaft or button operatively attached to the flexible wire rope shaft section. A method of conveying materials from a first point to at least one additional second point through the auger conveyor apparatus described above is also described.

These, and additional embodiments, will be apparent from the following descriptions.

BRIEF DESCRIPTION OF THE DRAWINGS

FIG. 1 illustrates the cross section of several commonly used wire rope configurations, useful in methods described herein.

FIG. 7 illustrates a wire rope with buttons installed along the length of the flexible wire rope shaft, which accommodate a point of connecting the flighting to the flexible wire rope shaft.

FIG. 9b is a more detailed illustration of the inlet area of the auger conveyor featured in FIG. 9a.

FIG. 9c is a more detailed illustration of the outlet area of the auger conveyor featured in FIG. 9a.

DETAILED DESCRIPTION

Figure 2A:
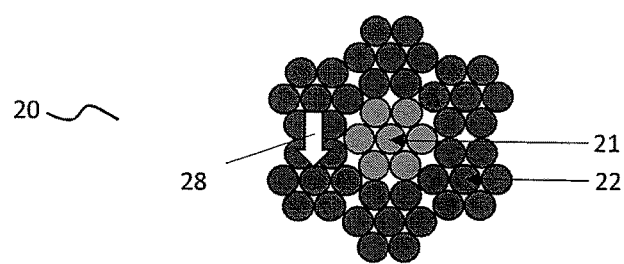
FIG. 2a is a cross sectional illustration of a common type of wire rope, useful in methods described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Mechanical solids conveyance has traditionally been accomplished by means of utilizing a conveyor to move a solids phase from an origin to a destination. However, if the origin is not in an unobstructed path to the destination, the solids must pass through one or more additional points before arriving at the destination. In such cases, additional augers are employed to move the solids from the origin to a staging point wherein they are collected by additional conveyors and moved to additional staging points, until such time that the destination is a direct, unobstructed path for the final conveyor.

Employing additional conveyors to transition an obstacle requires multiple augers, conduits, drive motors and supporting electrical infrastructure. Additional moving components within a process increases the probability of failure which can lead to expensive downtime. To employ a flexible auger within a rigid or semi-rigid conduit to convey materials over a non-linear path would be advantageous to the operator from both a reliability and economics perspective.

US Published Patent Application Ser. No. 2013/0132504A1 describes an auger to convey unstabilized drill cuttings which utilizes universal joints between sections of conventional augers within a semi-rigid trough. However, employing universal joints in this application causes extraordinary stress upon the universal joint closest to the motor because the first universal joint must bear the torque of the conveyor itself, plus any additional torque caused by the materials of conveyance, or plugging which can cause a sudden stop in rotation. For example, if something should become logged in a section of the auger flighting furthest away from the end of the auger close coupled to the motor, the universal joint closest to the motor bears more torque stress than the universal joint closest to the obstacle. Empirical research of using augers equipped with even a single universal joint to convey unstabilized drill cuttings, as identified in US Published Patent Application Ser. No. 2013/0132504A1 proves to be an unviable method due to fracture of the universal joint, and messy to repair due to the fact that the universal joint needs to be installed in a location which is full of abrasive and oily materials.

Other efforts have been made to build flexible augers. For example, U.S. Pat. No. 5,119,931 describes the use of a flexible joint constructed of a short cable with couplers on each end. The flexible cable joint is connected on both ends to conventional rigid auger shafts by means of a pinned socket, allowing the first rigid auger shaft to turn on a first axis while the second rigid auger shaft turns on a second axis. A single drive motor is connected to the first or second rigid shaft section while the flexible cable facilitates power transmission allowing rotation of both axes in unison. The use of a short cable section to create a flexible joint does permit conveyance over a non-linear path. However, the pinned-coupler design used to connect the rigid auger sections together becomes the weak point of the auger shaft assembly. Simply put, an auger shaft that is 25-75 mm (millimeters) in diameter would not be reliably reliant on a pin which is substantially smaller in diameter to communicate the torque necessary to facilitate rotation of all sections of an auger shaft and flighting.

Another example of an attempt at a flexible auger component is offered in U.S. Pat. No. 5,687,832. While the patent describes a straight shaft auger which is void of the capacity to flex, the auger flighting itself is designed to deform when obstacles such as large rocks would otherwise cause pinching between tight spots of the conveyor. The flexible blade or flight portion is constructed of rubber so that it can flex to accommodate obstacles, while reverting back to its original shape once the obstacle has passed. While the patent describes an apparatus which can deviate and reform its shape, it doesn't facilitate an ability to transition a non-linear pathway.

Another example of an attempt at a flexible auger is found in U.S. Pat. No. 3,727,746 where an outer shaft comprised of a flexible rubber tube (or like material) encases a semi-rigid inner shaft, while an elongated helical vane of flexible material (for example, rubber or plastic) is adhesively connected to the flexible tube, extending outward from the shaft. While the design would be somewhat flexible, it would not be suitable for use in industrial conveyor applications where long service life is as important as functionality.

Another example of an attempt at a flexible auger is found in U.S. Pat. No. 2,763,362 where short sections of conventional augers are connected by a universal joint. A drive motor causes a rotational motion of the rigid shaft section to be communicated through the universal joint from a first rigid auger section to a second rigid auger section. The auger is housed in a rigid casing with flexible sections inline to the universal joint location(s). While U.S. Pat. No. 2,763,362 describes an attempt at a flexible auger apparatus, the apparatus itself would clearly be prone to mechanical fracture due to the number of individually rotating components.

The more typical and common method of conveying solids over a non-linear path is to employ cable drags, more commonly known as chain drags by those in the industry. An example of a chain drag can be found in U.S. Pat. No. 2,756,866.

Chain drags consist of a closed loop rigid tube which might be manipulated in a multiple of directions. The closed loop rigid tube include an inlet hopper so that solids can enter the tube section, and an outlet where solids can be ejected from the tube section. Within the closed loop rigid tube section is a rotating drive sprocket which grabs and pulls on the paddles which are secured to a chain or cable within the rigid tube. As the rotating drive sprocket grabs a paddle it advances the paddle around the drive sprocket thereby sending the chain or cable (and paddles) in the opposite direction.

Chain drags are an excellent way to convey solids over a non-linear path. However, given the design is that of a closed loop circular path, any chain drag needs to travel in both a forward and return direction, and given that additional materials of construction would be needed, the capital cost of a drag conveyor is typically very high.

Several manufacturers, for example, Hapman, Flexicon, Agritech Slovakia and Pigtek Americas commercially market a flexible auger system. The materials of construction typically include a shaftless helical flight of sorts, running within a flexible conduit such as PVC (polyvinyl chloride)

pipe. The flexible auger system of all of the manufacturers mentioned above is generally the same in design and while the conveyors are certainly flexible, they are limited in length, rotational speed and diameter, for example. These limitations are due to the susceptibility of the shaftless helical flight to cork-screw and collapse, or durability of the flexible conduit itself. Most if not all of the flexible auger manufacturers above design their conveyors for the livestock or agriculture industries, where the materials of conveyance are granular (for example, grain seed or pellets) and have very low bulk densities (for example, less than 800 kilograms per cubic meter of volume).

Thus is the need for an improved method to facilitate conveyance of materials, from a first point to a second point, over a non-linear path, while not substantially removing the capacity or durability offered by conventional, linear auger conveyors.

A primary obstacle with employing an auger in a non-linear path is the auger shaft itself. As mentioned above, efforts have been made to create a flexible auger shaft, but previous efforts to mimic a reliable solid shaft are operationally disposed to fatigue and fracture, or limited in durability and capacity. To utilize a cost effective, readily available flexible shaft which is by its design, both flexible and extremely strong would be extremely operationally advantageous.

Wire rope, or steel rope, also known as cable, consists of several strands of steel wire twisted into a helix around a core. Steel wire can consist of non-alloy carbon steel or stainless steel. The higher the quality of the steel used to manufacture the wires, the higher the quality of wire rope also created. It is common to employ plow steel, or extra improved steel (EIS) or extra-extra improved steel (EEIS), the latter two being a higher quality plow steel.

Wire rope is both strong and reliable and typically the exclusive rope employed by lifting devices such as cranes or elevators, or to facilitate mechanical power transmission for example, tow trucks. While solid bar loops, for example chain, is also extremely strong, a failure is typically not foreseeable whereas flaws in wire rope are less critical because the other wires making up the cable accept the additional duty of a broken strand. Additionally, the helical design of wire rope causes friction between individual strands of wire, further compensating for the weakness of a few broken strands.

FIG. 1 illustrates the variety of wire configurations from just one of many wire rope manufacturers. Despite the variety, wire rope can generally be grouped into two categories;

1. Stranded ropes (10) consist of a core comprised of steel, wire rope or synthetic material which is covered by grouped steel strands laid in left or right twists and ordinary or lang lay directions;
2. Rotation resistant ropes (11) typically consist of two or more layers of steel wire strands laid helically around a core comprised of steel, wire rope or synthetic material. The direction of the first layer of steel strands covering the core is opposite the direction of the outer layer of steel strands that covers the core, which reduces the possibility of the wire rope twisting under load. Wire rope constructed with three steel lays in alternating directions around the core are the most resistant to rotation/twisting when under load (see also FIGS. 2a and 2b).

Figure 2B:
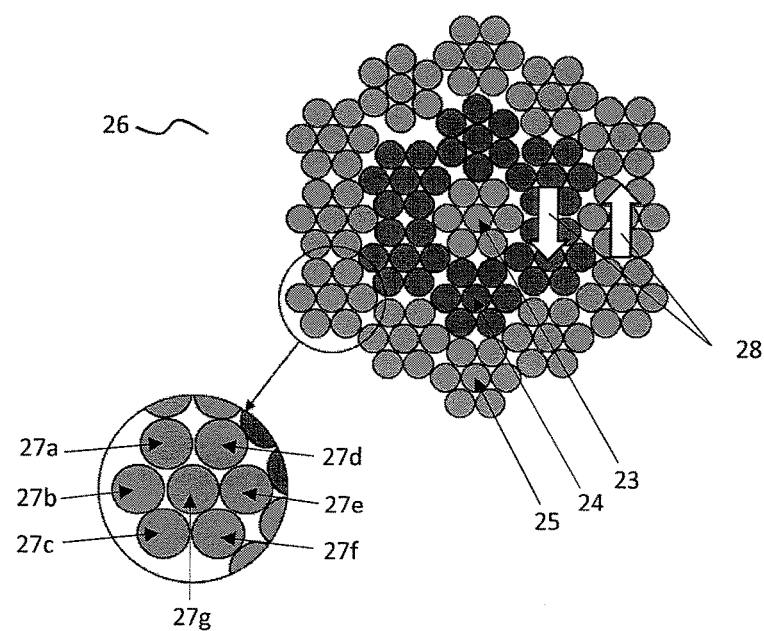
FIG. 2b is a cross sectional illustration of a non-rotational or anti-rotational wire rope, useful in methods described herein.

FIGS. 2a and 2b further illustrate the difference between the two in a simplistic manor. FIG. 2a is a cross section of a stranded rope (20) with an inner core (21) covered by a single outer lay (22). FIG. 2b is a cross section of a rotation resistant rope (26) with an inner core (23) covered by a first lay (24), covered by a second lay (25) running in a direction (of helical laying) opposite the first lay (24). Additionally, FIGS. 2a & b include arrows (28) showing the directional arrangement of each lay.

While auger conveyors generally only run in one direction, a non-rotational wire rope would provide the operator with the ability to reverse the rotation without damaging the non-rotational wire rope and thus, the preferred material for shaft construction in the embodiment described within.

Given wire rope consists of many strands of smaller wire (27a, 27b, 27c, 27d, 27e, 27f and 27g), welding or fusing auger flighting directly to the wire rope could cause the individual strands to become damaged or substantially brittle and prone to cracking. Thus, an embodiment described herein includes the use of buttons, which facilitate an operational connection between the flexible wire rope and the auger flighting.

Ferrule buttons are hydraulically compressed against the wire rope. Ferrule buttons are typically made of carbon steel or stainless steel and are highly resistant to hot or cold temperatures, or stress cracks, and depending on the type of wire rope employed, typically have an efficiency of greater than 90% of the catalog strength of the wire rope. Ferrule buttons can also be custom manufactured to be shorter or longer or thicker or thinner or wedge shaped or other, which meet the requirements of the end user.

Figure 3A:
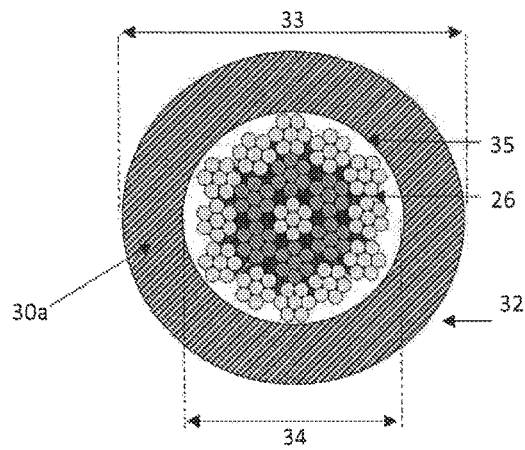
FIG. 3a illustrates a cross section of a button placed on wire rope before the button has been compressed against the wire rope, useful in methods described within.
Figure 3B:
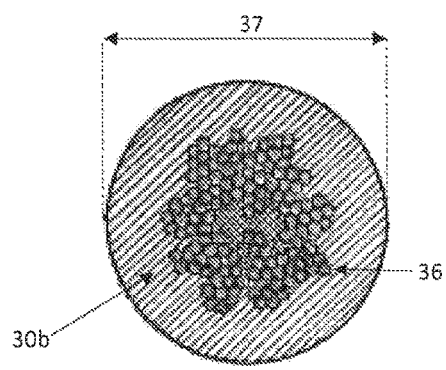
FIG. 3b illustrates a cross section of a button on the wire rope after the button has been compressed against the wire rope, which accommodates a point to connect the flighting to the flexible wire rope shaft, useful in methods described within.
Figure 3C:
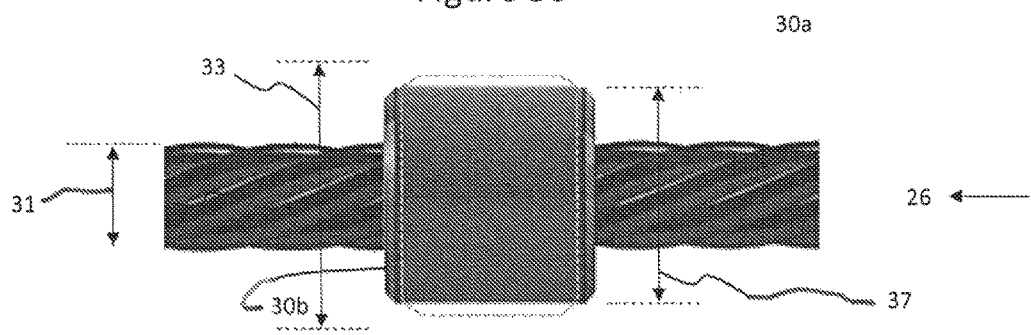
FIG. 3c is a cross section of a button, compressed against a flexible wire rope, which accommodates a point of connecting the flighting to the flexible wire rope shaft, useful in the methods described within.

Prior to being compressed, each button (see, for example, 30a in FIG. 3) is slid over the wire rope (26) to a desired location and thereafter, hydraulically compressed onto the wire rope to cause the button to become artificially fused in place, unable to slide or move along the length of wire rope. This is commonly known as "seizing" or "terminating" on the wire rope. FIGS. 3a & 3b illustrate a cross section of a button and wire rope before (30a) and after (30b) the button has been compressed against the wire rope. The outer edge (32) of the button is of a larger diameter (33) than the hollow core (35) of the button's inner diameter (34), which in turn has a larger diameter (31) than the wire rope (26). Once compressed, the button is effectively cold fused to the wire rope due to the fact that the button has been squeezed to the point that the button forms into and around (36) the texture of the wire rope itself. Compression of the button is complete once the hydraulic compression tool has met the stress requirements, predetermined by the manufacturer of the button. The stress imposed on a button through conventional hydraulic compression will typically result in the outer diameter being approximately 10% less than before it was compressed, while the length of the button is typically greater following compression. The information in the Table is from section 3 of the Hanes Supply/CCISCO catalog (the disclosure of which is incorporated herein by reference) and illustrates the resulting change in size of a ferrule button of at least one manufacturer.

TABLE

| | Diameter | | Length | |
|---|---|---|---|---|
| Wire rope size | (pre compression) | (post compression) | (pre compression) | (post compression) |
| 19.05 mm | 49.93 mm | 39.37 mm | 69.34 mm | 82.55 mm |
| .75 inches | 1.69 inches | 1.55 inches | 2.73 inches | 3.25 inches |
| 25.4 mm | 57.15 mm | 52.07 mm | 93.22 mm | 110.74 mm |
| 1.0 inches | 2.25 inches | 2.05 inches | 3.67 inches | 4.36 inches |
| 31.75 mm | 71.37 mm | 65.02 mm | 116.33 mm | 137.67 mm |
| 1.25 inches | 2.81 inches | 2.56 inches | 4.58 inches | 5.42 inches |

Hydraulically compressible ferrule buttons are a commercially available product, commonly sold by industrial supply shops and accordingly, particularly useful with this embodiment described herein.

Figure 4A:
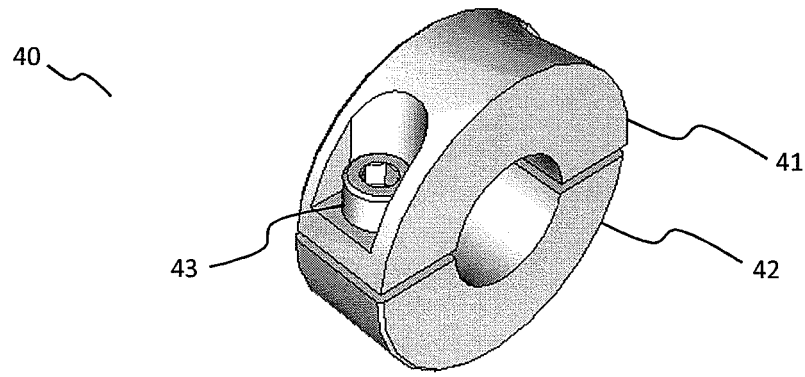
FIG. 4a illustrates a commercially available split collar, which can also be used as a clamp on button, which accommodates a point of connecting the flighting to the flexible wire rope shaft, useful in the methods described within.
Figure 4B:
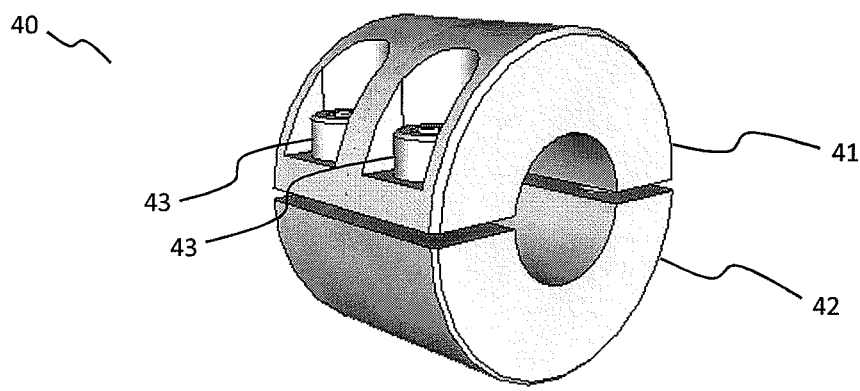
FIG. 4b illustrates a second, wider version of a commercially available clamp on button, which accommodates a point of connecting the flighting to the flexible wire rope shaft, useful in the methods described within.
Figure 4C:
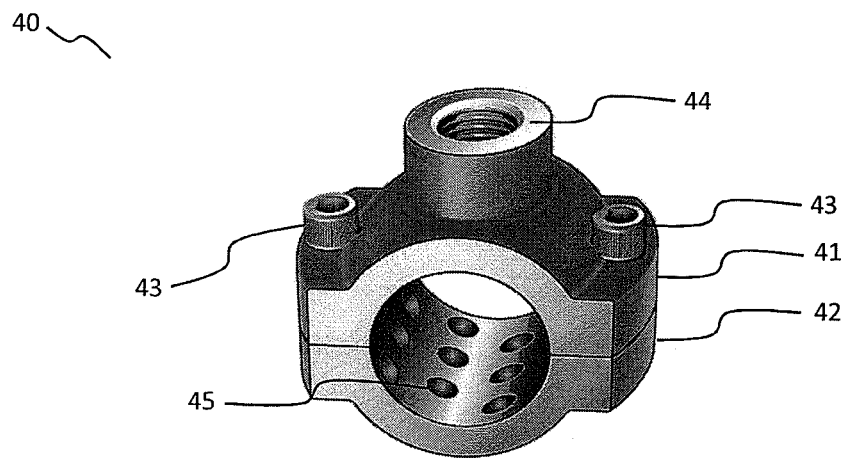
FIG. 4c demonstrates a commercially available clamp on button, which accommodates a removable connector to bridge between the button and auger flight(s), useful in the methods described within.

FIGS. 4a, 4b and 4c also illustrate another type of button that would be useful herein. Also commercially available, a split collar (40) consisting of a top section (41) and bottom section (42), permit a bolt or screw (43) to hold the top and bottom sections together, or permit a clamp (not shown) to hold the top and bottom sections together. A split collar would offer the user the ability to removably attach the split collar to the flexible wire rope and flighting. Like that of a ferrule button, the split collar can also prevent the heat induced by welding to not be transferred to the wire rope, thereby preventing damage of the individual strands. If there is a concern of the button slipping along the flexible wire rope, then the hollow corridor of the button (which accommodates the wire rope) can include grip strips (not shown) or nubs (45) to provide additional traction between the button and the wire rope. Additionally, a button which can clamp onto the flexible wire rope, while not substantially limiting the flexibility of either the wire rope or flighting has the added benefit of being removable if the first placement is not ideal and, a split collar which is extremely narrow or very wide can be utilized, by installing, marking, removing, altering (for example, welding a threaded connection (44) onto the outer section of the button wherein a threaded connector leg can be threaded into the button which thereafter, is weld directly to the flight, and still be reinstalled with no effect to the wire rope.

Figure 4D:
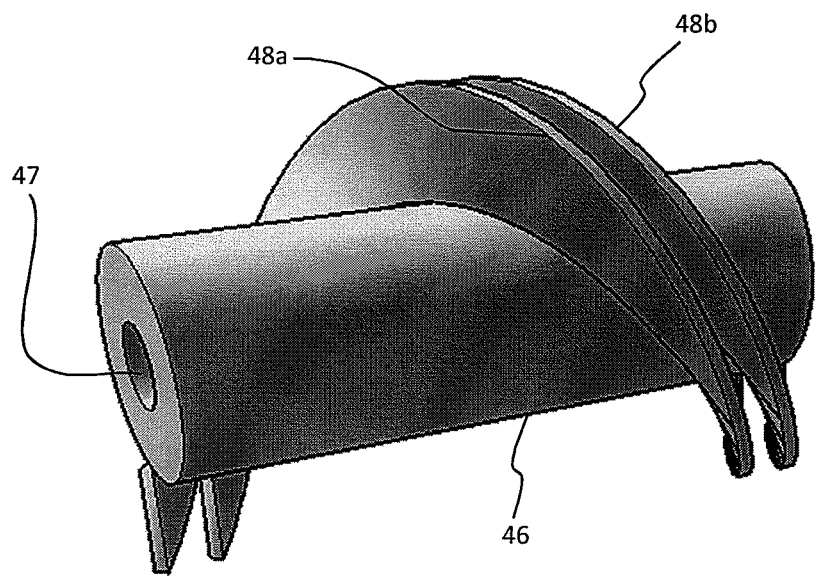
FIGS. 4d and 4e illustrate additional a third, slide on versions of buttons that mechanically secure against both the flexible wire rope and flighting, useful in the methods described within.
Figure 4E:
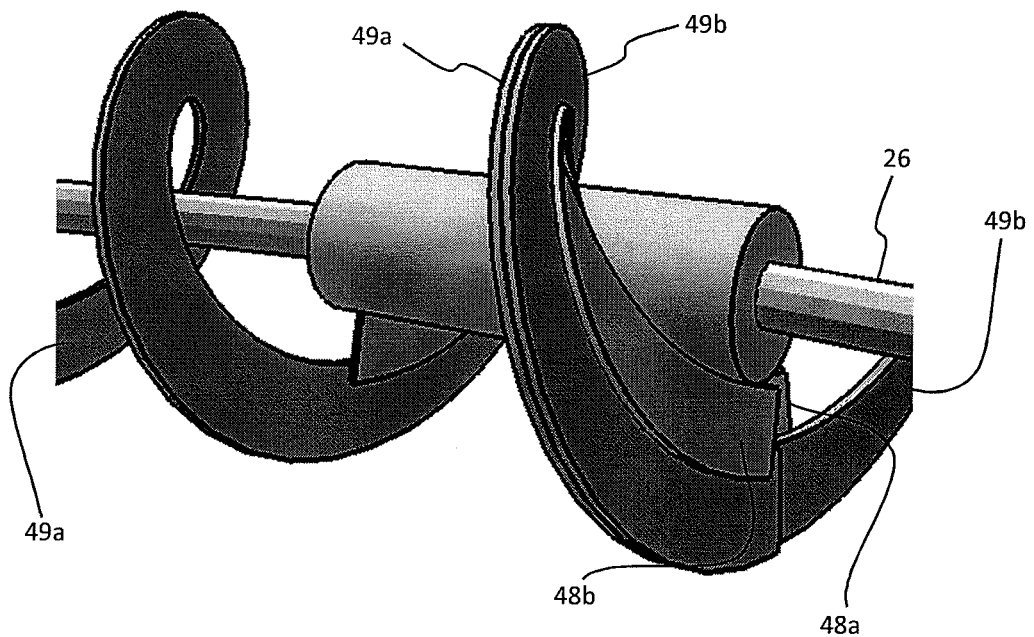

Roxell (a division of CTB, Inc.) manufactures a product known as an "auger coupler" which is used to connect two lengths of auger flighting together to be a single, longer length. While visually similar to the "auger coupler", an alternative design of a button is demonstrated in FIGS. 4d and 4e where a spoon button (46) is created with at least a partial flight (48a), thereby being able to at least partially spoon a portion of the flighting (49a) length to facilitate a point of contact between the flighting and the flexible wire rope shaft (26). This button design also includes a hollow core (47) so that the spoon button (46) can be slid over the wire rope (26) and secured in place (thereby ensuring it can't move inline of the wire rope). Securing this type of button to the wire rope may include any variety of clamp designs (for example a pipe clamp or sleigh clamp), or set screw(s), or alternate method which accomplishes the same. Additionally, like the Roxell "auger coupler", FIGS. 4d & 4e illustrate that the dual partial flights (48a & 48b) of the spoon button facilitate a point of contact between the wire rope and a single auger length (49a) or, facilitate a point of contact between the wire rope and two auger lengths (49a & 49b), while also connecting two auger lengths (49a & 49b) to become one single longer auger length.

Those knowledgeable in the art will recognize that without limitation, a button may include ferrules or swaging sleeves, or clamp-on-couplers, or an alternate device which by intended design or otherwise, can be secured to the flexible wire rope and either directly or indirectly the flighting, while not limiting the functional flexibility of either the wire rope or flighting.

In an example illustrated in FIG. 7, compressible buttons (70) are securely attached along the length of the wire rope (26) thereby creating a foundation whereupon the fabricator of the non-linear auger conveyor can connect the flexible shaft to the flighting. Regardless of the type of flighting utilized with an embodiment described herein, at least intermittent sections of the flighting will need to be connected to the buttons on the flexible wire rope shaft in order to prevent the flighting from bearing significant amounts of torque during use.

Figure 8A:
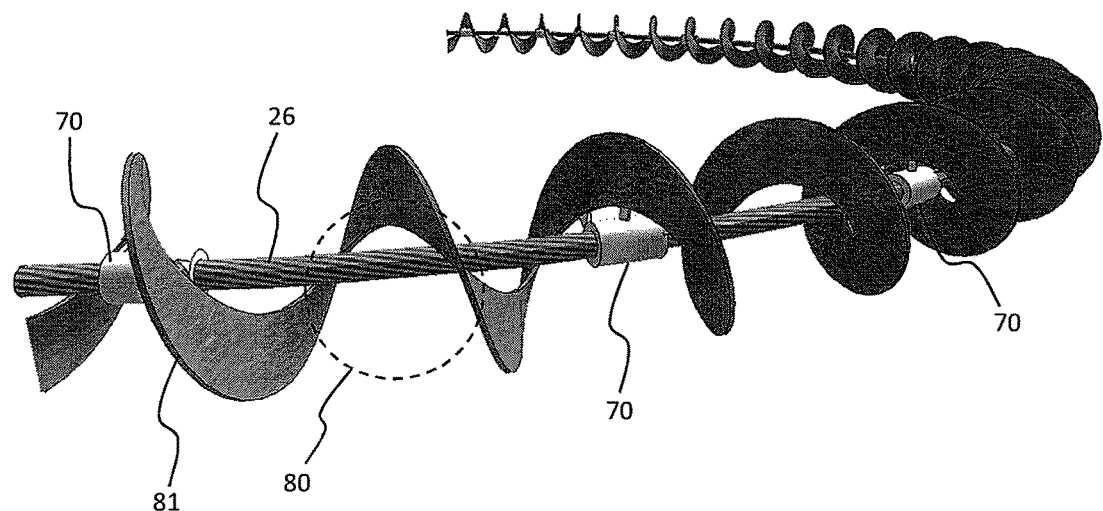
FIG. 8a illustrates a flexible wire rope shaft with compressible buttons connected to at least some of the auger flights along the shaft section.

Regardless of the button design, the buttons inadvertently create short rigid sections along the flexible wire rope shaft. While short rigid sections are counterproductive to building a flexible shaft, certain (albeit isolated) amounts of rigidity along a flexible wire rope shaft is acceptable. Like FIG. 7, FIG. 8a illustrates the same flexible wire rope (26) with compressible buttons (70) installed along its length. However, FIG. 8a also illustrates that not every flight requires a point of securement. It would be reasonable to skip every other flight, or several flights in a row, thereby leaving them suspended and free (80) to move with greater flexibility than those flights attached to the flexible wire rope with buttons. Suspending greater than 50% of the flights along a flexible wire rope shaft would be of less concern to an auger manufacturer because short shaftless augers are less prone to failure than long shaftless augers. Each time the flighting is connected to the flexible wire rope shaft, the length of the shaftless auger is reset by the rigidity of the (flexible wire rope) shaft auger.

Figure 8B:
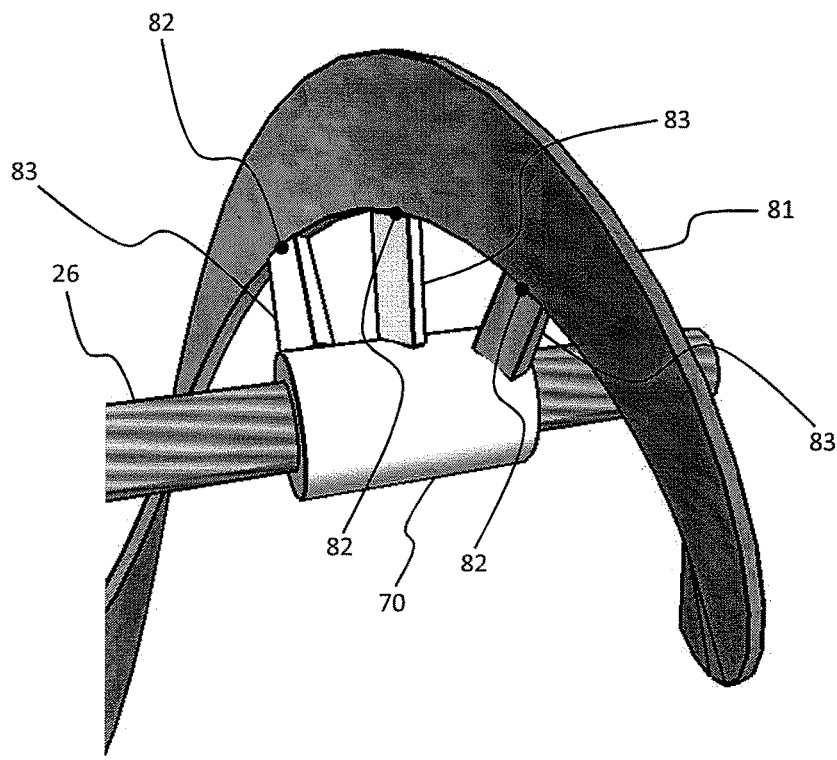
FIG. 8b illustrates a flexible wire rope shaft with compressible buttons operatively connected by means of connecting stand-off legs between the button and ribbon flight.

As previously identified, the buttons can be manufactured in many different types and styles (for example 30a, 40 or 46). Regardless of the button design, the point of the button is create a connection point (82) between the flight (81) and the button (70). FIG. 8b illustrates how stand-off legs (83) can be used to facilitate a connection point (82) between the flight (81) and the button (70). The stand-off legs (83) will typically be the same material as what the button is made of, and substantially round or square or rectangular, and typically welded or bolted to the button and flighting. Welding to the button for example, will not cause the same concerns as welding directly to the wire rope because the thickness of the button will provide an opportunity for heat to disperse to atmosphere, or substantially diffuse throughout the portions of the button which are in contact against the wire rope thereby reducing if not eliminating the possibility of heat induced wire rope failure.

The next obstacle with employing an auger in a non-linear path is the flighting, which like the flexible shaft, must also be capable of running along an infinite number of axes.

Figure 5A:
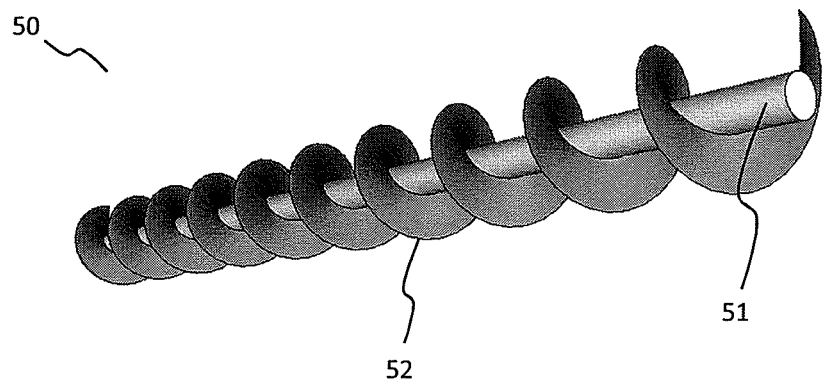
FIG. 5a illustrates a typical helical or sectional auger flight with a shaft running through the core of the auger.
Figure 5B:
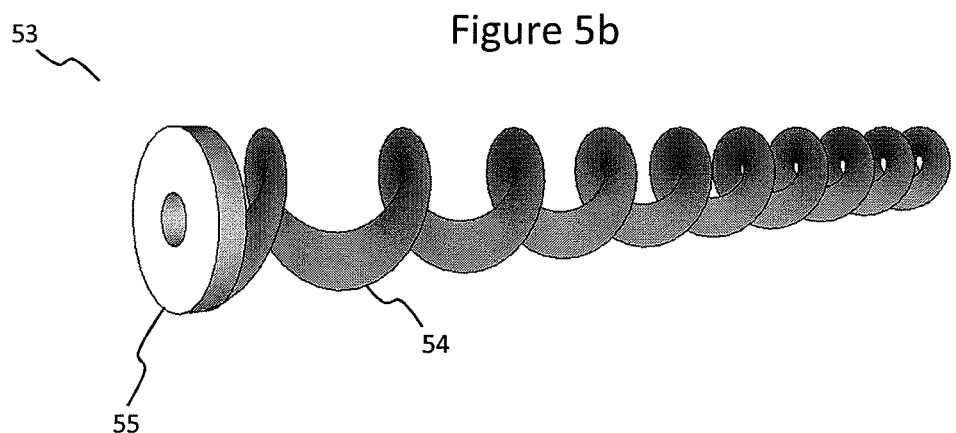
FIG. 5b illustrates a typical shaftless helical auger flight with shaft coupler installed at one end of the flighting section.

Generally, auger conveyors can be grouped into two primary categories which are illustrated in FIGS. 5*a* and 5*b*:
a) Augers which employ a shaft (50) that run parallel to the length of the conveyor. The outer diameter of the shaft is at least equal to or less than the inner diameter of the flighting. The shaft (51) typically extends from the flighting (52) supported by one or more bearings drive gear (not shown), which facilitate rotation; and,
b) Augers which are built without a shaft (53) running the full length of the conveyor. The shaftless flighting (54) is typically connected to a bearing and drive motor by means of at least a short shaft section (not shown), or coupling device (55) which facilitates transmission of power to the flighting (54).

While each has application benefits, shaftless augers are typically limited in length when compared to augers employing a shaft, due to the fact that the flighting needs to bear the torque of the auger, friction and weight of the materials of conveyance. These factors are a significant concern because flexural rigidity of the flighting needs to be maintained or the flighting will corkscrew, thereby collapsing upon itself and require repair or replacement of the flighting section. Obviously this failure can lead to a productivity downtime and/or expensive repair costs.

Figure 5C:
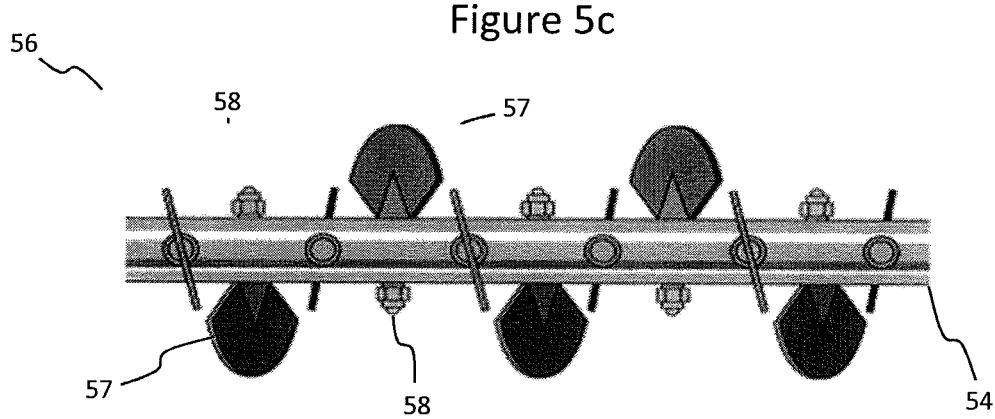
FIG. 5c illustrates a typical paddle auger wherein the shaft has angled paddles operatively connected to the shaft.
Figure 6A:
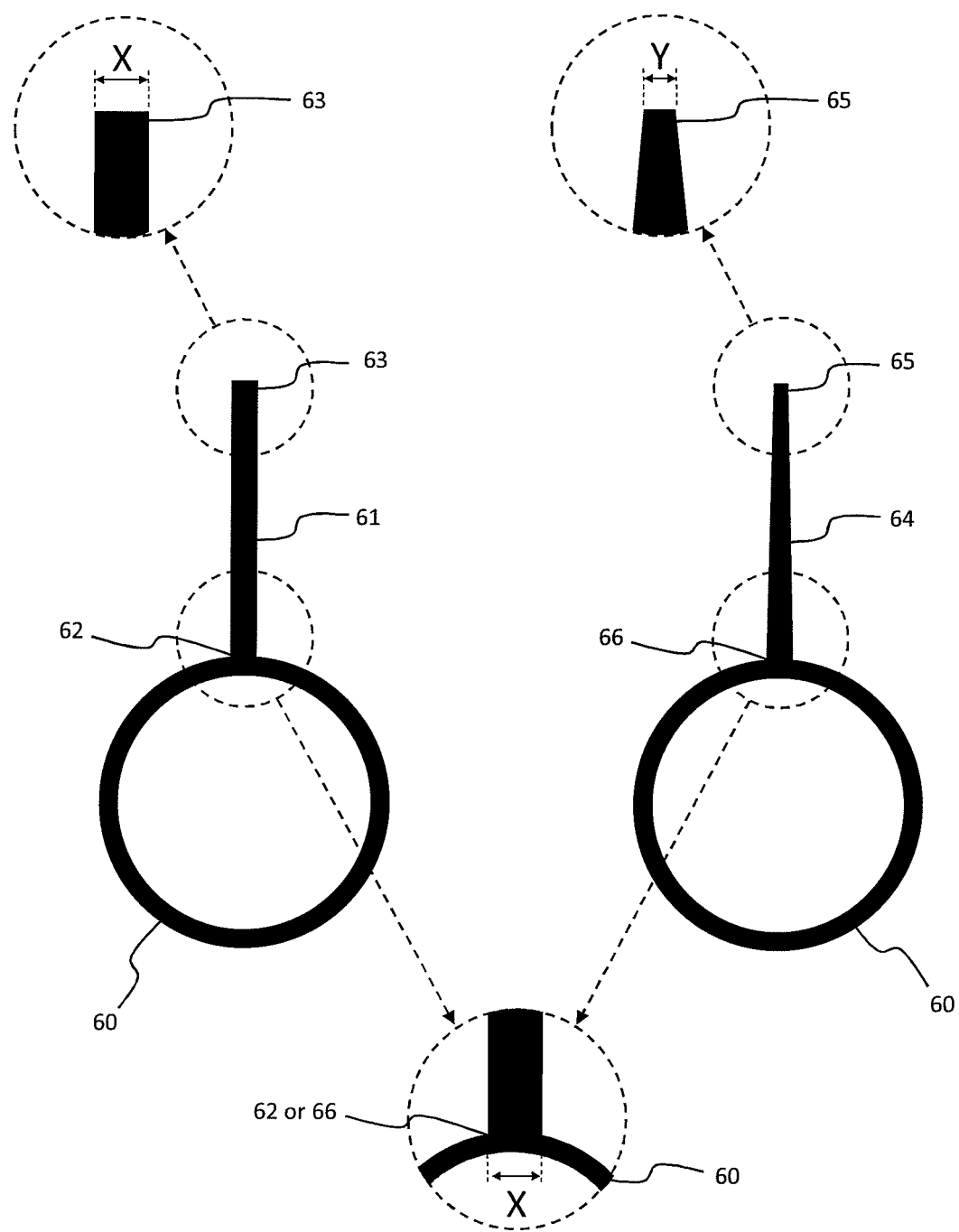
FIG. 6a is a cross sectional line drawing of a shaft and sectional flight (left), and a shaft and helical flight (right), which illustrate the differences in thickness between the two common types of auger flighting.
Figure 6B:
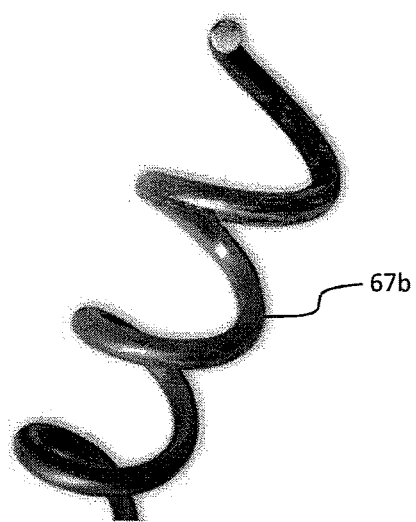
FIG. 6b illustrates a type of helical auger ribbon flighting made of round bar.
Figure 6C:
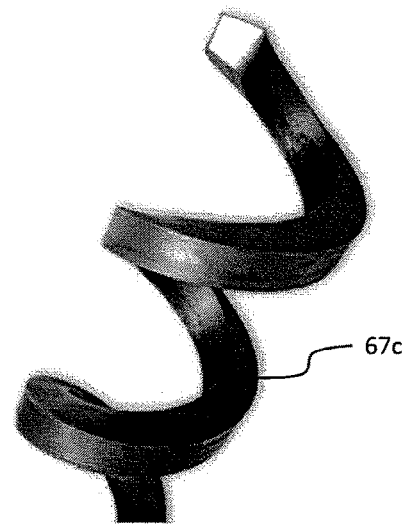
FIG. 6c illustrates a type of helical auger ribbon flighting made of square bar.
Figure 6D:
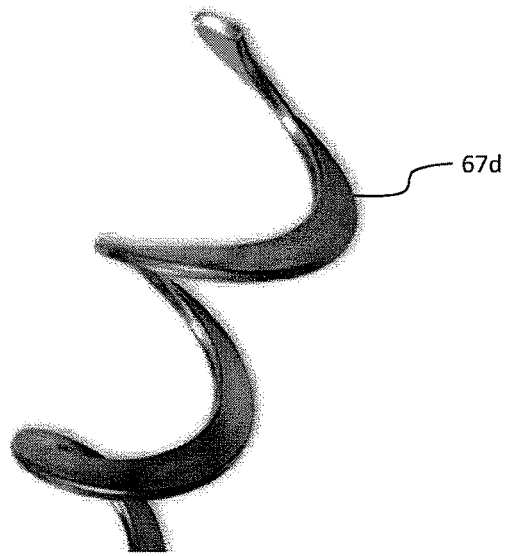
FIG. 6d illustrates a type of helical auger ribbon flighting made of flat wire.
Figure 6E:
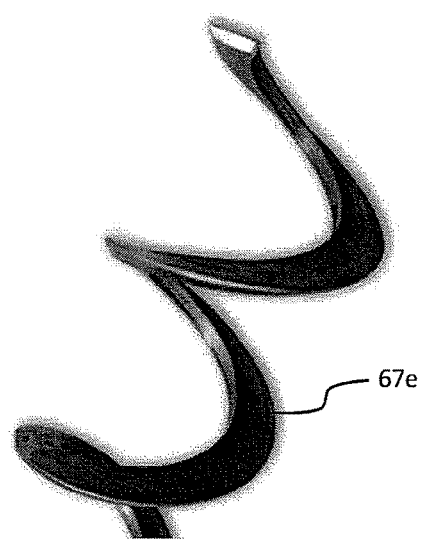
FIG. 6e illustrates a type of helical auger ribbon flighting made of beveled wire.

Auger flighting can generally be grouped into three categories. FIG. 6 is a cross sectional illustration the two most common types of flighting which are sectional and helicoid. The cross section of these two types of flighting shows a hollow tube shaft (60) section for reference. Alternatively, a solid shaft (not shown) can also be employed. Paddle flights are the least common of the three.
a) Sectional flights (61) are individual flights arranged end to end or overlapping, to create one longer auger length. This type of flighting is typically stamped or cut from a sheet of plate steel and bent or formed into the desired pitch. The thickness (marked by an X) of the flight is a constant value from the ID (62) where it is seamed to the shaft (60) to the OD (63) of the flight(s);
b) Helicoid flights (64) are a length of continuous flights, formed from a single length of steel. This type of flighting is typically thinner near the OD (65) while the ID (66) where it is seamed to the shaft (60) is thicker. This is due to the fact that the steel must stretch around the diameter, which means there is less steel along the stretch and more steel in sections where stretching did not occur. To compensate for the thinner section of a stretched flight, some manufactures add hard facing or an additional layer of steel to compensate for a known, high wear area. FIG. 6 further illustrates that X (being the thickness of the flight) is constant in all locations except for Y, or the area between X and Y;
c) Paddle augers (56) are illustrated in FIG. 5*c*. While less common, paddle augers (56) comprise spades (57), operatively connected (58) to a shaft section (54). Paddle augers are typically used to mix or blend materials, during the term of conveyance. Conveyance occurs intermittently along the length of the auger as each spade (57) contacts the materials;

Both sectional or helicoid flights can be built in left or right twists, and many pitches thereafter including standard flight pitch (wherein the length of a single flight is equal to its diameter), short pitch (wherein the length of a single flight is less than its diameter), long pitch (wherein the length of a single flight is greater than its diameter), variable pitch, or a combination of the aforementioned, notched flights, ribbon flights, tapered flights, coned flights, and hollow flights (which permit the circulation of heating or cooling fluid). Further, flighting can have coatings, wear shoes, bristles, or hard facing for durability, among other options.

The auger flighting employed within a non-linear conveyor needs to be capable of flexing on greater than one axis at any moment in time (herein after referred to an infinite number of axes). Those knowledgeable will recognize that the flighting employed on the embodiment described herein without limitation, may be selected from:
Generally thinner (as opposed to thicker) conventional auger flights which are either sectional (61) or helicoid (64) or a combination of both; or,
Ribbon flights which are either sectional (and typically flat) or helicoid (and typically made from round bar (67*b*), square bar (67*c*), flat bar (67*d*) or beveled wire (67*e*)), or a combination of both.

While it would be possible to build a non-linear conveyor and conduit that run in a complete circle, the minimum possible diameter of the circular conveyor would obviously need to be larger for larger augers and smaller for smaller augers. Given the embodiments described herein are novel and the use of wire rope to create the flexible shaft is non-typical, there was no research or data currently found to determine the axial stiffness of a wire rope with buttons along its length. Information about the safe wrapping diameter of a wire rope along a spool (commonly known as a Diameter to Diameter ratio, or D to D ratio) is available and hereafter discussed for reference only.

Generally, wire manufacturers will wrap a stranded wire rope to a 15:1 ratio wherein the first number is the spool diameter and the second number is the diameter of the wire rope. In the case of a wire rope which is under a substantial load, it is considered a good practice to spool the wire rope at a ratio of 40:1. For example, a 2.54 cm (centimeter) diameter wire rope would be spooled on a spool with a minimum diameter of 38.1 cm's, or 101.6 cm's for wire rope under high loading conditions. Lacking qualitative data regarding the axial stiffness of a wire rope used in this application, it is recommended that the flexible shaft described herein should be employed at a minimum D to D ratio (diameter of wire rope to the implied diameter of the non-linear axis) of not less than the greater of the two, regardless of the fact that the wire rope isn't under a load.

Figure 9A:
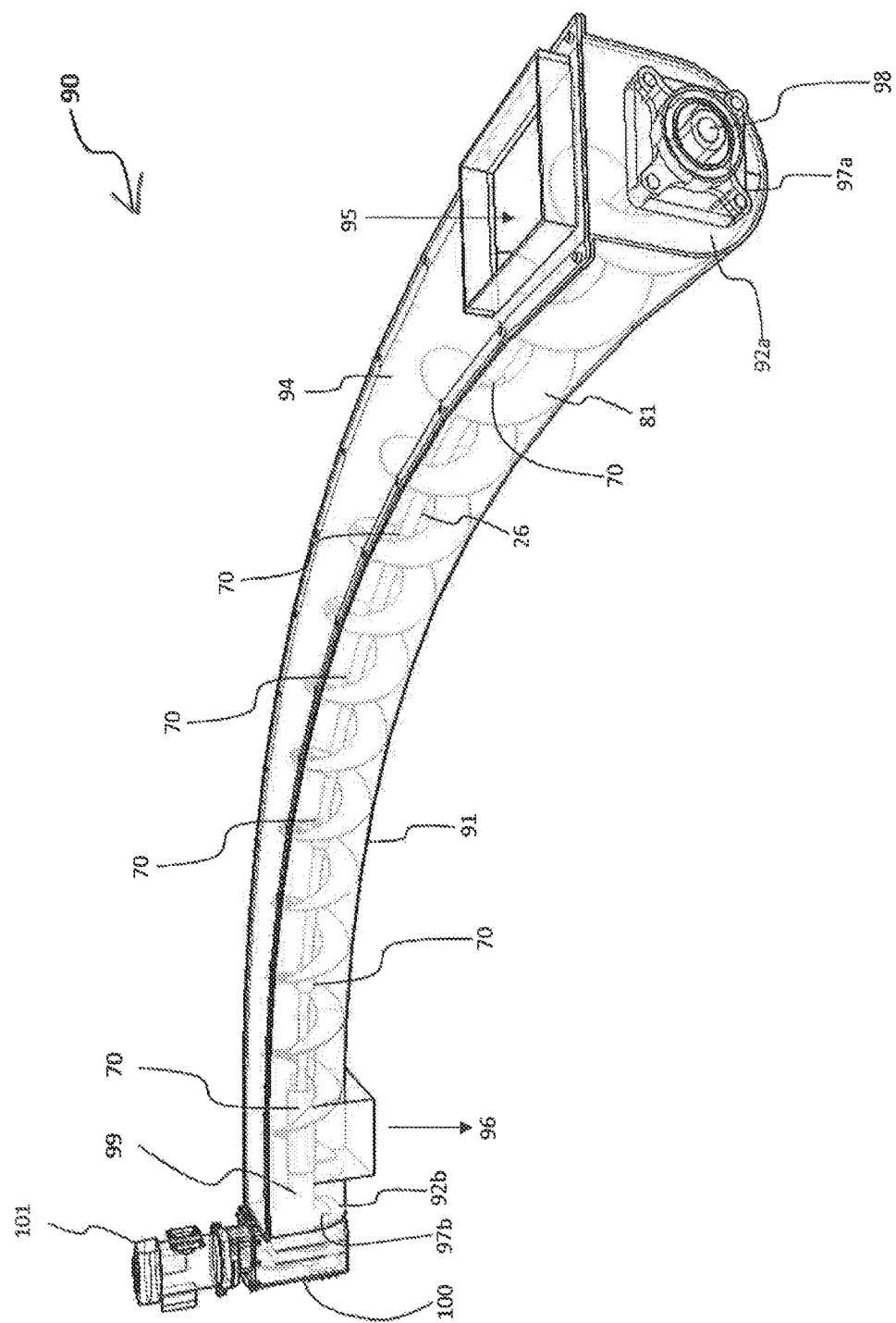
FIG. 9a illustrates a complete auger conveyor with ribbon flighting connected to a flexible wire rope shaft running along the inside of a non-linear conduit.
Figure 9B:
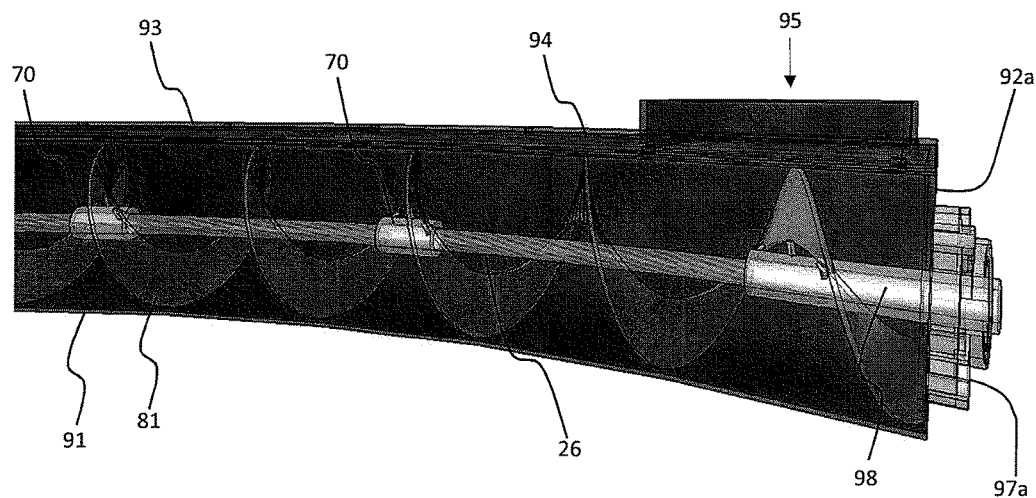
Figure 9C:
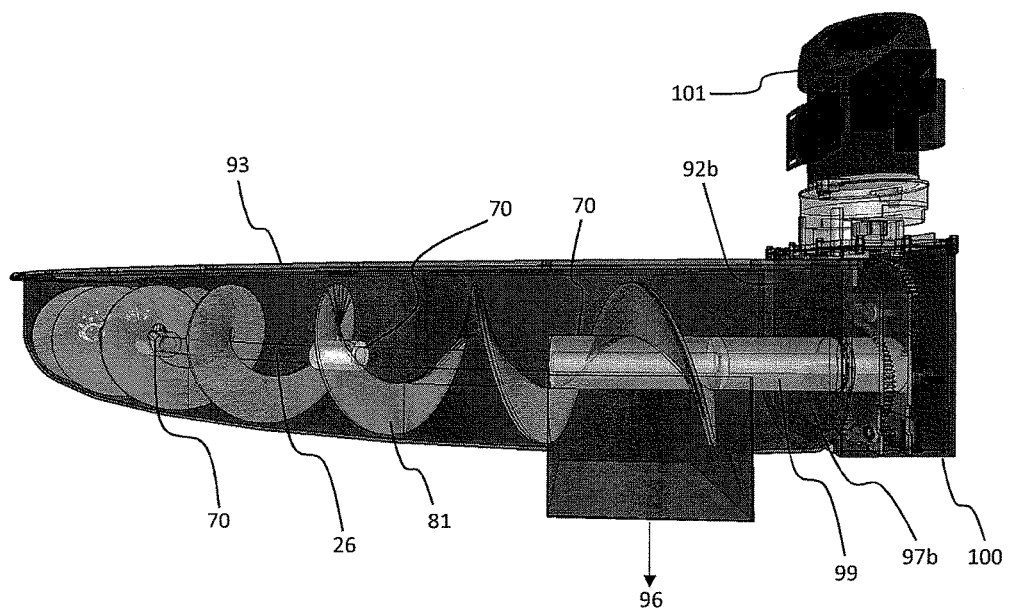

FIGS. 9*a*, 9*b* and 9*c* are X-ray views of a complete auger conveyor (90) that is running along a non-linear path. In this example, the conduit (91) comprises a U-shaped trough with an end plate (92*a* and *b*) to (ideally) support a flange type bearing (97*a* and *b*) and bolt-on flanged (93) cover plate (94). The inlet (95) is typically located above the flighting (81) while the outlet (96) is typically located below the flighting (81). FIGS. 9*b* and 9*c* are more detailed illustrations of the inlet (95) of FIG. 9*a* and outlet (96) of FIG. 9*a* respectively.

As mentioned above, the inlet (95) permits the materials being conveyed (not shown) to drop in through an opening in the cover plate (94). The flexible wire rope (26) shaft is ideally equipped with a short rigid shaft section (98) which extends through the end plate (92*a*) into a supporting bearing (97*a*). The short rigid shaft section can be coupled to a button, or directly to the flexible wire rope (26). The outlet (96) permits the materials being conveyed to drop away from the flighting (81) through an opening in the conduit (91). In FIG. 9*c*, the flexible wire rope (26) shaft is ideally equipped with a short rigid shaft section (99) which extends through a second end plate (92b) into a supporting bearing (97b) and thereafter, close coupled to the drive components which typically include a gearbox (100) and motor (101) for example, a pneumatic or hydraulic or electric motor. Those knowledgeable in the art will recognize that the bearing nearer the drive end is ideally flanged against the end plate (92b) and the bearing is that of a trust bearing, which is a commercially available bearing design which permits a load against the rollers of the bearing (not shown). The installation of a thrust bearing (97a or 97b) against either end plate (92a & 92b) supports the need to apply a minimum amount of tension against the wire rope there by reducing (if not eliminating) the possibility of the wire rope twisting upon itself and collapsing in length. The short rigid drive shaft section (99) can either be directly coupled to a button, or to the flexible wire rope (26) either of which being desirable, provided the drive shaft is able to communicate the torque and rotational speed of the drive components to the flexible wire rope shaft, buttons, stand-offs (83) (if equipped), partial flights (48a & 48b) (if equipped) and flighting (81). While not illustrated, those knowledgeable in the art will recognize that the bearing will need to have a slack adjustor installed to apply a minimum amount of tension to the length of flexible wire rope shaft.

Figure 10:
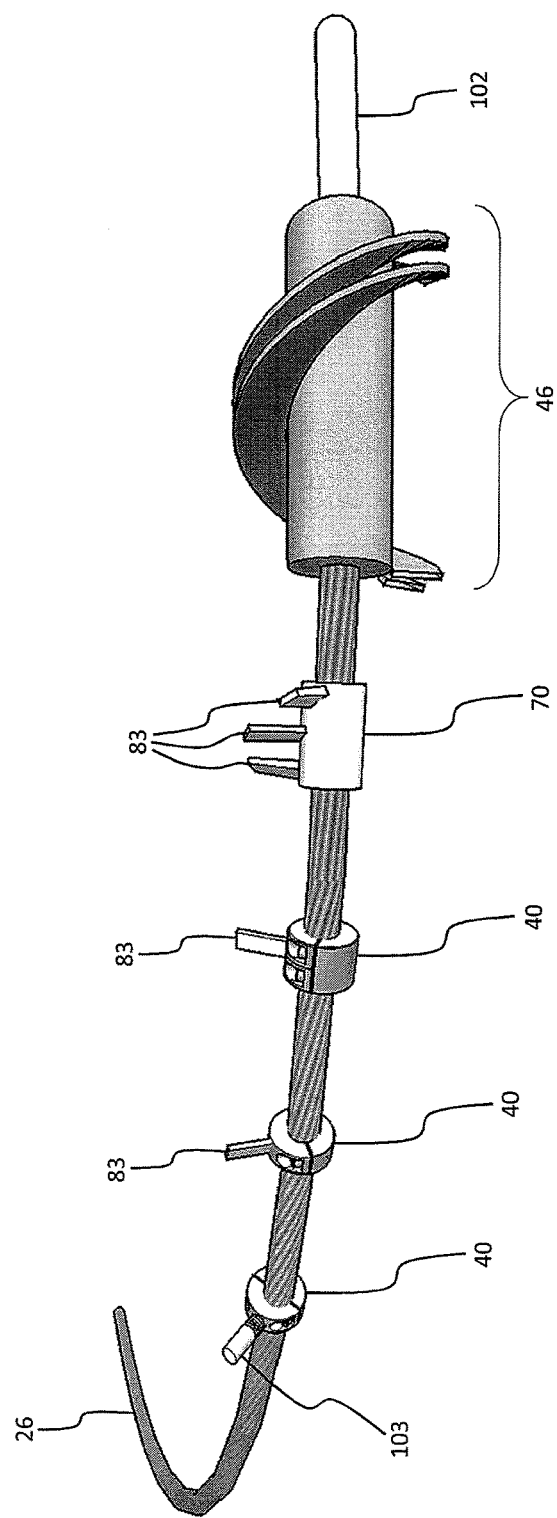
FIG. 10 demonstrates an auger with different types of buttons along its length.

FIG. 10 is included to demonstrate a flexible wire rope shaft (26) with different types of buttons attached along its length. On the far right side of FIG. 10 there is a solid section (102) which is a shaft bar operatively connected to the first button (46) used to accommodate a point of connection to rotational drive gear, for example a sprocket and or gearbox and motor. A compressible button (70) (also illustrated in FIG. 7) with standoff legs (83) is also shown on the same flexible shaft. A split collar button (40) (also illustrated in FIG. 4b) with a single standoff leg (83) is also shown on the same flexible shaft. Another split collar button (40) (also illustrated in FIG. 4a) with a single standoff leg (83) is also illustrated. The button on the left is a split collar (40) style button (also illustrated in FIG. 4c) with a bolt on stand-off leg (103) which bolts to the split collar. The standoff leg welds to the flighting (not shown). As demonstrated, more than one style of button can be chosen.

Given the unlikely possibility of a process employing an auger which runs a distance which is shorter than ten times its diameter, the construction details of an auger running along an infinite number of axes will (at least initially) be largely empirical by design. It is however reasonable to estimate that the flexible auger described herein would include flexible flighting that is at least three times greater than the diameter of the flexible wire rope shaft.

Whether the non-linear conveyor is running at a slight deviation to a linear axis for example, less than 10°, or a substantial deviation to a linear axis for example, greater than 10°, or a uni-directional deviation, the embodiments described herein can be safely and reliably operated along what is considered to be, an infinite number of axes at all times.

An added benefit of using wire rope as a flexible shaft is that wire rope by design, almost entirely lacks any elasticity. For example, non-rotational wire rope which is pulled to 50% of its breaking strength, will stretch (also known as elastical elongation) less than 1% of its length. A wire rope, employed as a flexible shaft is only intended be tensioned to a fraction of its breaking strength because tensioning the wire rope will cause the flexible shaft to become more linear, as opposed to following the natural curvature of the conduit. Tension causing elastical elongation of the wire rope which is greater than 0.5% would undoubtedly cause damage or unnecessary wear between the flighting or conduit. However, lacking at least some measure of tension against the wire rope would provide the opportunity for slack in the wire rope to collapse upon itself if the flexible auger was to encounter unintended torque during use. While the ideal tension of a flexible auger shaft will be empirical the wire rope should be installed such that the wire rope hasn't exceeded an elastical elongation of greater than 0.5% and likely less than 0.1% and ideally, as close to 0% as is reasonably possible.

The need to create a minimum tension against the length of wire rope employed as a shaft is a significant concern of design. During moments of extraordinary torque, slack in the length of wire rope could permit the flexible wire rope shaft to lose rotational integrity and twist upon itself, thereby collapsing in length, which would damage the conveyor components for example, the flighting, conduit or drive gear. A thrust bearing is ideally installed at both ends of the flexible auger to achieve at least a minimum amount of tension along the flexible auger shaft. Trust bearings are commercially available from any number of suppliers and would combat an unintended contraction in length of the wire rope, for example, a twist causing a collapse in length. While not illustrated in the figures, those knowledgeable in the art will recognize that the trust bearing should be mounted to a tensioner which can be adjusted to apply some tension to the flexible wire rope shaft. Given that the wire rope is substantially unable to elastically elongate and given the trust bearings will combat a contraction in wire rope length, the wire rope shaft is unlikely to be a point of failure.

As mentioned above, employing a flexible auger shaft where the elastical elongation is as close to 0% as possible, is preferred. However, in an alternate arrangement of this embodiment, the auger could be designed to freely float within the conduit, secured only by a bearing nearer the drive end, which is typically nearer the outlet of the auger conveyor. This would be useful in applications where the flexible auger described is running with a fully flexible, rubber hose.

The conduit of an auger conveyor is intended to guide the materials of conveyance during the term of conveyance. The conduit includes at least one inlet where the materials enter the conveyor, and at least one outlet where the materials exit the conveyor. In most auger conveyors, the conduit consists of steel such as round pipe, or a 'U' shaped trough, or a combination of both, over the length of the auger conveyor. Typically the auger (and if equipped, the shaft), are suspended at each end of the conduit by bearings (for example, flanged thrust bearings). This permits the auger section to freely rotate about on any axis, generally with a close tolerance between the OD of the flighting and the ID of the conduit. Depending on the diameter of the flighting, or length of the auger, or use of a shaft or shaftless auger, hanger bearings can be employed to reduce the possibility of auger sag along the length of the auger section. Hanger bearings (not shown) can be installed along the side or top of the conduit, but generally not along the bottom where the materials of conveyance are carried.

Those knowledgeable in the art will recognize that the conduit described herein without limitation, may be selected from round pipe, or hose, or a U-shape casing formed with a curvature along the bottom to accommodate the shape of the flexible auger flighting. The materials used to create the conduit may include one or more types of steel (for example mild steel or stainless steel), or plastic or synthetic plastic (for example, UHMW (ultra-high molecular weight) or PVC), or rubber or synthetic rubber, or other suitable materials, or combination of materials.

The ends of wire rope tend to fray readily. An added feature of the apparatus described herein is that the use of buttons is expected to prolong the life cycle of the wire rope by reducing or eliminating the possibility of frayed wires along the wire rope, or loosening wires at the end of the wire rope therefor requiring the wire rope be repaired by cutting the wire rope length shorter to remove the damaged end(s) (in conventional wire rope applications).

While the embodiment described herein discusses at length the use of a flexible auger shaft running along a non-linear path, the flexible auger shaft could also be utilized to run on a single linear axis, parallel to the conduit of the auger. To use the flexible auger shaft in a linear axis application would serve as a replacement to a conventional, hollow pipe or solid pipe as a shaft material.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An auger conveyor apparatus particularly adapted for conveying materials from a first point to at least one additional second point comprising,
    at least one section of auger flighting attached to a rotation resistant flexible wire rope shaft section,
    an elongated conduit at least partially surrounding the at least one section of auger flighting creating a housing for the auger flighting, the conduit including at least one flighting inlet section and at least one flighting outlet section extending along the length of the conduit and at least one end wall,
    the conveyor capable of having more than one axis of travel over the entirety of the length of the conduit,
    at least one first bearing at or near the inlet and/or outlet section,
    the at least one bearing capable of being attached to a rigid drive shaft operatively attached to the flexible wire rope shaft section, and
    a mechanical rotation power source connected to the rigid drive shaft capable of causing the flighting and shaft to simultaneously rotate about the more than one axis of travel,
    including at least one button compressed against the flexible wire rope shaft section creating a solid point to which the auger flighting is attached,
    wherein the button is steel and is capable of being used as a point of contact for a hangar bearing to suspend the button and wire rope section within the conduit.

2. The apparatus of claim 1 wherein the flexible wire rope shaft section comprises at least one section of wire rope.

3. The apparatus of claim 2 wherein the flexible wire rope shaft section comprises a left lay wire rope.

4. The apparatus of claim 2 wherein the flexible wire rope shaft section comprises left lay wire rope with left hand flighting.

5. The apparatus of claim 2 wherein the flexible wire rope shaft section comprises left lay wire rope with right hand flighting.

6. The apparatus of claim 2 wherein the flexible wire rope shaft section comprises right lay wire rope.

7. The apparatus of claim 2 wherein the flexible wire rope shaft section comprises right lay wire rope with right hand flighting.

8. The apparatus of claim 2 wherein the flexible wire rope shaft section comprises right lay wire rope with left hand flighting.

9. The apparatus of claim 2 wherein the flexible wire rope is up to 25 millimeters in diameter.

10. The apparatus of claim 2 wherein the flexible wire rope is greater than 25 millimeters in diameter.

11. The apparatus of claim 2 wherein the flexible wire rope is at least 50 millimeters in diameter.

12. The apparatus of claim 2 wherein the flexible wire rope is at least 75 millimeters in diameter.

13. The apparatus of claim 1 wherein the flexible wire rope shaft section comprises multiple wire ropes wound together to create a single wire rope section.

14. The apparatus of claim 1 additionally containing helical flighting around the flexible wire rope greater than three times the diameter of flexible wire rope shaft.

15. The apparatus of claim 1 including a button clamped to the flexible wire rope shaft section creating a solid point to which the auger flighting is attached.

16. The apparatus of claim 1 including multiple buttons compressed against the wire rope shaft section, each button being separated from the other along a length of the wire rope shaft section.

17. The apparatus of claim 1 including a hangar bearing which is attached to and at least partially suspends the wire rope section within the conduit.

18. The apparatus of claim 1 wherein the conduit comprises a round pipe or a substantially U-shape trough.

19. The apparatus of claim 1 wherein the conduit comprises metal.

20. The apparatus of claim 1 wherein the conduit comprises rubber.

21. The apparatus of claim 1 wherein the conduit comprises flexible synthetic pipe.

22. The apparatus of claim 1 including at least one second bearing at or near the inlet and/or outlet section located opposite the inlet and/or outlet section where the first bearing is located, the second bearing capable of accommodating at least one solid steel shaft or button operatively attached to the flexible wire rope shaft section.

23. A method of conveying materials from a first point to at least one additional second point through the auger conveyor apparatus of claim 1.

24. An auger conveyor apparatus particularly adapted for conveying materials from a first point to at least one additional second point comprising,
    at least one section of auger flighting attached to a rotation resistant flexible wire rope shaft section,
    an elongated conduit at least partially surrounding the at least one section of auger flighting creating a housing for the auger flighting, the conduit including at least one flighting inlet section and at least one flighting outlet section extending along the length of the conduit and at least one end wall,
    the conveyor capable of having more than one axis of travel over the entirety of the length of the conduit,
    at least one first bearing at or near the inlet and/or outlet section,
    the at least one bearing capable of being attached to a rigid drive shaft operatively attached to the flexible wire rope shaft section, and a mechanical rotation power source connected to the rigid drive shaft capable of causing the flighting and shaft to simultaneously rotate about the more than one axis of travel including a short solid steel shaft section that protrudes from the end wall of the conduit and is supported by at least one bearing and is operationally connected to a button which is compressed against the longer flexible wire rope shaft section.

25. The apparatus of claim 24 wherein the flexible wire rope shaft section comprises at least one section of wire rope.

26. The apparatus of claim 24 wherein the flexible wire rope shaft section comprises multiple wire ropes wound together to create a single wire rope section.

27. The apparatus of claim 26 wherein the flexible wire rope shaft section comprises a left lay wire rope.

28. The apparatus of claim 26 wherein the flexible wire rope shaft section comprises left lay wire rope with left hand flighting.

29. The apparatus of claim 26 wherein the flexible wire rope shaft section comprises left lay wire rope with right hand flighting.

30. The apparatus of claim 26 wherein the flexible wire rope shaft section comprises right lay wire rope.

31. The apparatus of claim 26 wherein the flexible wire rope shaft section comprises right lay wire rope with right hand flighting.

32. The apparatus of claim 26 wherein the flexible wire rope shaft section comprises right lay wire rope with left hand flighting.

33. The apparatus of claim 26 wherein the flexible wire rope is up to 25 millimeters in diameter.

34. The apparatus of claim 26 wherein the flexible wire rope is greater than 25 millimeters in diameter.

35. The apparatus of claim 26 wherein the flexible wire rope is at least 50 millimeters in diameter.

36. The apparatus of claim 26 wherein the flexible wire rope is at least 75 millimeters in diameter.

37. The apparatus of claim 24 additionally containing helical flighting around the flexible wire rope greater than three times the diameter of flexible wire rope shaft.

38. The apparatus of claim 24 including a button clamped to the flexible wire rope shaft section creating a solid point to which the auger flighting is attached.

39. The apparatus of claim 24 including multiple buttons compressed against the wire rope shaft section, each button being separated from the other along a length of the wire rope shaft section.

40. The apparatus of claim 24 including a hangar bearing which is attached to and at least partially suspends the wire rope section within the conduit.

41. The apparatus of claim 24 wherein the conduit comprises a round pipe or a substantially U-shape trough.

42. The apparatus of claim 24 wherein the conduit comprises metal.

43. The apparatus of claim 24 wherein the conduit comprises rubber.

44. The apparatus of claim 24 wherein the conduit comprises flexible synthetic pipe.

45. The apparatus of claim 24 including at least one second bearing at or near the inlet and/or outlet section located opposite the inlet and/or outlet section where the first bearing is located, the second bearing capable of accommodating at least one solid steel shaft or button operatively attached to the flexible wire rope shaft section.

46. A method of conveying materials from a first point to at least one additional second point through the auger conveyor apparatus of claim 24.

47. An auger conveyor apparatus particularly adapted for conveying materials from a first point to at least one additional second point comprising, at least one section of auger flighting attached to a rotation resistant flexible wire rope shaft section, an elongated conduit at least partially surrounding the at least one section of auger flighting creating a housing for the auger flighting, the conduit including at least one flighting inlet section and at least one flighting outlet section extending along the length of the conduit and at least one end wall, the conveyor capable of having more than one axis of travel over the entirety of the length of the conduit, at least one first bearing at or near the inlet and/or outlet section, the at least one bearing capable of being attached to a rigid drive shaft operatively attached to the flexible wire rope shaft section, and a mechanical rotation power source connected to the rigid drive shaft capable of causing the flighting and shaft to simultaneously rotate about the more than one axis of travel, and wherein the short solid steel shaft section is operationally connected to a button which is compressed against the longer flexible wire rope shaft section and wherein the short solid steel shaft section is close coupled to a button which is operationally connected to the longer flexible wire rope shaft section.

48. The apparatus of claim 47 wherein the flexible wire rope shaft section comprises at least one section of wire rope.

49. The apparatus of claim 47 wherein the flexible wire rope shaft section comprises multiple wire ropes wound together to create a single wire rope section.

50. The apparatus of claim 49 wherein the flexible wire rope shaft section comprises a left lay wire rope.

51. The apparatus of claim 49 wherein the flexible wire rope shaft section comprises left lay wire rope with left hand flighting.

52. The apparatus of claim 49 wherein the flexible wire rope shaft section comprises left lay wire rope with right hand flighting.

53. The apparatus of claim 49 wherein the flexible wire rope shaft section comprises right lay wire rope.

54. The apparatus of claim 49 wherein the flexible wire rope shaft section comprises right lay wire rope with right hand flighting.

55. The apparatus of claim 49 wherein the flexible wire rope shaft section comprises right lay wire rope with left hand flighting.

56. The apparatus of claim 49 wherein the flexible wire rope is up to 25 millimeters in diameter.

57. The apparatus of claim 49 wherein the flexible wire rope is greater than 25 millimeters in diameter.

58. The apparatus of claim 49 wherein the flexible wire rope is at least 50 millimeters in diameter.

59. The apparatus of claim 49 wherein the flexible wire rope is at least 75 millimeters in diameter.

60. The apparatus of claim 47 additionally containing helical flighting around the flexible wire rope greater than three times the diameter of flexible wire rope shaft.

61. The apparatus of claim 47 including a button clamped to the flexible wire rope shaft section creating a solid point to which the auger flighting is attached.

62. The apparatus of claim 47 including multiple buttons compressed against the wire rope shaft section, each button being separated from the other along a length of the wire rope shaft section.

63. The apparatus of claim 47 including a hangar bearing which is attached to and at least partially suspends the wire rope section within the conduit.

64. The apparatus of claim 47 wherein the conduit comprises a round pipe or a substantially U-shape trough.

65. The apparatus of claim 47 wherein the conduit comprises metal.

66. The apparatus of claim 47 wherein the conduit comprises rubber.

67. The apparatus of claim 47 wherein the conduit comprises flexible synthetic pipe.

68. The apparatus of claim 47 including at least one second bearing at or near the inlet and/or outlet section located opposite the inlet and/or outlet section where the first bearing is located, the second bearing capable of accommodating at least one solid steel shaft or button operatively attached to the flexible wire rope shaft section.

69. A method of conveying materials from a first point to at least one additional second point through the auger conveyor apparatus of claim 47.

* * * * *